United States Patent
Yamamoto et al.

(10) Patent No.: US 8,812,202 B2
(45) Date of Patent: Aug. 19, 2014

(54) DRIVE CONTROLLER OF OPERATING MACHINE

(75) Inventors: Ryo Yamamoto, Kobe (JP); Masahiro Yamada, Kobe (JP); Yoji Yudate, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/518,634

(22) PCT Filed: Jan. 11, 2011

(86) PCT No.: PCT/JP2011/000072
§ 371 (c)(1),
(2), (4) Date: Jun. 22, 2012

(87) PCT Pub. No.: WO2011/086888
PCT Pub. Date: Jul. 21, 2011

(65) Prior Publication Data
US 2012/0259497 A1 Oct. 11, 2012

(30) Foreign Application Priority Data
Jan. 13, 2010 (JP) .................................. 2010-004632

(51) Int. Cl.
*B60T 8/00* (2006.01)
*B60T 8/34* (2006.01)
*B60T 8/44* (2006.01)
*B60T 8/52* (2006.01)

(52) U.S. Cl.
CPC ... *B60T 8/52* (2013.01); *B60T 8/34* (2013.01); *B60T 8/44* (2013.01)
USPC .................. 701/54; 701/84; 701/90; 303/112; 303/141

(58) Field of Classification Search
CPC .......... B60T 8/52; B60T 11/00; B60T 11/10; B60T 13/745

USPC .......... 701/54, 84, 90, 101, 112; 303/53, 112, 303/114.1, 125, 129, 141; 73/49.7, 54.35, 73/862.193
See application file for complete search history.

(56) References Cited

U.S. PATENT DOCUMENTS 6,220,028 B1 * 4/2001 Ishikawa et al. ................ 60/431
7,037,236 B2 * 5/2006 Ishibashi et al. ................ 477/52
(Continued)

FOREIGN PATENT DOCUMENTS

JP   A 2004-360216   12/2004
JP   A-2005-290882   10/2005
(Continued)

OTHER PUBLICATIONS

Apr. 12, 2011 International Search Report issued in International Patent Application No. PCT/JP2011/000072.

*Primary Examiner* — Mary Cheung
*Assistant Examiner* — Atul Trivedi
(74) *Attorney, Agent, or Firm* — Oliff PLC

(57) ABSTRACT

A drive controller of an operating machine configured to drive a structure by a hydraulic motor and an electric motor includes: a remote control valve configured to determine the operation amount of the structure; an electric motor torque calculation portion configured to calculate torque of the electric motor; a hydraulic motor torque calculation portion configured to calculate torque of the hydraulic motor; a controller configured to transmit an opening position control signal to the control valve based on the operation amount determined by the remote control valve such that torque necessary to drive the structure is obtained from the torque of the electric motor and the torque of the hydraulic motor; and solenoid-operated reducing valves and each configured to reduce a pilot pressure, to be applied to the control valve, based on the opening position control signal output from the controller.

10 Claims, 11 Drawing Sheets

(56) References Cited

U.S. PATENT DOCUMENTS

| | | | |
|---|---|---|---|
| 7,673,948 B2* | 3/2010 | Otomo | 303/114.1 |
| 2002/0020579 A1* | 2/2002 | Yamamoto et al. | 180/446 |
| 2003/0097837 A1* | 5/2003 | Hiraki et al. | 60/486 |
| 2004/0158377 A1* | 8/2004 | Matsumoto et al. | 701/48 |
| 2005/0173570 A1* | 8/2005 | Tanaka et al. | 241/36 |
| 2008/0195286 A1* | 8/2008 | Tabata et al. | 701/51 |
| 2008/0221771 A1* | 9/2008 | Olsson | 701/83 |
| 2008/0238187 A1* | 10/2008 | Garnett et al. | 303/112 |
| 2008/0276606 A1* | 11/2008 | Petre | 60/413 |
| 2008/0277230 A1* | 11/2008 | Youtt | 192/57 |
| 2008/0279700 A1* | 11/2008 | Anderson et al. | 417/390 |
| 2008/0317574 A1* | 12/2008 | Moriya et al. | 414/687 |
| 2009/0032360 A1* | 2/2009 | Asano | 192/87.13 |
| 2009/0112421 A1* | 4/2009 | Sah et al. | 701/59 |
| 2009/0112423 A1* | 4/2009 | Foster et al. | 701/60 |
| 2009/0308066 A1* | 12/2009 | Satake | 60/433 |
| 2010/0004835 A1* | 1/2010 | Kuwahara et al. | 701/59 |
| 2011/0071738 A1* | 3/2011 | Kawasaki et al. | 701/50 |

FOREIGN PATENT DOCUMENTS

| | | |
|---|---|---|
| JP | A 2005-350945 | 12/2005 |
| JP | A-2007-056998 | 3/2007 |
| JP | A-2008-063888 | 3/2008 |
| JP | A-2008-291522 | 12/2008 |
| KR | 10-0720271 B1 | 5/2007 |

* cited by examiner

US 8,812,202 B2

DRIVE CONTROLLER OF OPERATING MACHINE

TECHNICAL FIELD

The present invention relates to a controller of a driving device for use in an operating machine, and particularly to a drive controller of an operating machine configured to drive a structure by a hydraulic motor and an electric motor.

BACKGROUND ART

Power machineries, such as hydraulic excavators, cranes, wheel loaders, and bulldozers, (in the present description and claims, these power machineries (heavy machineries) are collectively called "operating machines") have been used for civil engineering works, construction works, and the like. Taking the hydraulic excavator as an example, the hydraulic excavator is configured such that: a revolving super structure (structure) is provided on the upper portion of a base carrier; and the revolving super structure includes an engine, a driver's seat, an arm having a tip end on which a bucket is provided, a boom coupled to the arm, and the like and is thus a large heavy structure. By manipulating a remote control valve at the driver's seat during operations, the revolving super structure is caused to revolve on the upper portion of the base carrier, and various operations are performed by the bucket provided at a tip end of the arm. The revolving super structure is caused to revolve by a driving device configured to cause the revolving super structure to revolve. In recent years, a device including a hydraulic motor and an electric motor has been proposed as the driving device.

One example of the operating machine including this type of driving device is an operating machine described in PTL 1. The operating machine of PTL 1 includes a driving device having a hydraulic unit and an electric unit. The hydraulic unit includes a hydraulic motor as a driving source, and the electric unit includes an electric motor as a driving source. The driving device is configured to control the electric motor by a controller and an inverter at the time of revolution and assist the hydraulic unit by the torque of the electric motor.

According to this operating machine, when the driving device performs steady revolution or decelerates, the electric motor is caused to perform a regenerative action, and regenerative electric power is stored in a capacitor. Moreover, at the time of the revolution, if a revolution speed or a revolution acceleration rate is equal to or higher than a set value, and the amount of electric power stored in the capacitor is equal to or smaller than a set value, a control unit of the driving device causes the electric motor to generate the regenerative electric power and stores the regenerative electric power in the capacitor. According to this operating machine, the control unit calculates the torque required at the time of the revolution. When the obtained required torque exceeds a set value, the electric motor is caused to output necessary torque.

The control unit controls output torque of the electric motor while shortening as much as possible a time in which a relief valve provided at a hydraulic motor circuit discharges oil. With this, energy loss by the relief valve is suppressed. Further, by providing a buffer poppet on a spring side of the relief valve, a boost buffer (shockless) function is performed at the time of acceleration, and the relief operation is performed after the oil pressure reaches the peak.

As above, according to the operating machine, the maximum torque can be secured as a whole by assisting the hydraulic unit by the electric unit. Moreover, the necessary torque can be generated by adjusting the torque generated by the assist of the electric unit. With this, the energy saving and the prevention of the generation of hunting caused by excessive torque can be achieved.

As other prior arts, there are, for example, a construction machinery described in PTL 2 and a hybrid construction machinery described in PTL 3. The construction machinery described in PTL 2 includes a hybrid driving device having a driving force synthesis mechanism configured to synthesize the driving force of a hydraulic actuator and the driving force of a motor generator. In addition, to effectively utilize energy generated at the time of braking, the construction machinery is provided with a communication valve (bypass valve). With this, inertial energy of the revolving super structure is tried to be efficiently regenerated as electric energy by the motor generator. The hybrid construction machinery of PTL 3 is configured such that: a pressure difference between both ports of the hydraulic actuator is detected; and a torque command is output to the motor generator, provided close to the hydraulic actuator, in accordance with the pressure difference.

CITATION LIST

Patent Literature

PTL 1: Japanese Laid-Open Patent Application Publication No. 2005-290882
PTL 2: Japanese Laid-Open Patent Application Publication No. 2008-291522
PTL 3: Japanese Laid-Open Patent Application Publication No. 2008-63888

SUMMARY OF INVENTION

Technical Problem

In many cases, the operating machine performs operations, such as sand digging and loading operations of the hydraulic excavator, of exponentially accelerating or decelerating the revolving super structure that is the structure. Therefore, in order to cause the revolving super structure that is the large heavy structure and an inertial body to revolve at a desired speed, the remote control valve is manipulated quickly and largely in many cases.

In the operating machine of PTL 1, the flow rate control is performed by applying secondary pressure of the remote control valve directly to pilot ports of a control valve. Therefore, if the remote control valve is largely manipulated at the time of the revolution operation, the control valve largely opens at the time of the revolution acceleration, and hydraulic oil ejected from the hydraulic pump entirely flows into the hydraulic motor circuit. In this case, even if the relief valve having the boost buffer function is used in the above-described hydraulic motor circuit, only a part of the inflow oil is used as power for driving the hydraulic motor until the revolving super structure that is the inertial body reaches a desired revolution speed, and the rest of the inflow oil is discharged through the relief valve. Therefore, energy use efficiency deteriorates. Since the large energy loss is generated at the time of the revolution acceleration in which the energy consumption increases, the energy use efficiency significantly deteriorates. Such deterioration of the energy use efficiency occurs similarly in the driving device configured to accelerate a structure other than the revolving super structure.

The control unit is configured to cause the electric motor to output necessary torque only when the torque required at the time of the revolution exceeds a required value. Therefore, under an operating condition in which comparatively small torque is required consecutively, an operating time of the electric motor may not be secured adequately. Therefore, there may be a situation where the stored electric energy cannot be adequately utilized.

Further, when the control valve is closed at the time of braking, the hydraulic motor circuit becomes a closed circuit. Even if the electric motor assists deceleration torque, hydraulic torque is generated, and the relief valve is activated. Therefore, the inertial energy at the time of the deceleration cannot be efficiently recovered as the electric energy.

In the invention described in PTL 2, as with PTL 1, the secondary pressure of the remote control valve is applied directly to the pilot ports of the control valve. Therefore, a large amount of hydraulic oil is supplied to the control valve when the remote control valve is manipulated. Until the revolving super structure reaches the desired speed and the hydraulic motor reaches a predetermined torque, a large amount of hydraulic oil is discharged through the relief valve. This causes the energy loss.

Moreover, the invention described in PTL 3 describes that pressures at a hydraulic oil supply port and discharge port of the hydraulic motor are detected, and the operation of a generator motor is controlled. However, PTL 3 does not describe a detailed control method of supplying the hydraulic oil to the hydraulic motor by utilizing the above pressures.

Here, an object of the present invention is to provide a drive controller of an operating machine capable of suppressing energy loss by precisely controlling the amount of oil supplied to a hydraulic motor.

Solution to Problem

To achieve the above object, the present invention is a drive controller of an operating machine configured to drive a structure by a hydraulic motor and an electric motor configured to cooperate with the hydraulic motor, the hydraulic motor being supplied with hydraulic oil from a hydraulic pump through a hydraulic motor circuit, a flow rate of the hydraulic oil being controlled by a control valve, the drive controller including: a remote control valve configured to determine an operation amount of the structure; an electric motor torque calculation portion configured to calculate torque of the electric motor; a hydraulic motor torque calculation portion configured to calculate torque of the hydraulic motor; a controller configured to output an opening position control signal based on the operation amount determined by the remote control valve, the opening position control signal being output to operate the control valve such that torque necessary to drive the structure is obtained from the torque of the electric motor and the torque of the hydraulic motor; and a solenoid-operated reducing valve configured to reduce pilot pressure, to be applied to the control valve, based on the opening position control signal output from the controller. In the present description and claims, for example, if the structure is the revolving super structure, "the operation amount of the structure" denotes a revolution operation amount of the revolving super structure, such as the revolution direction, revolution speed, and revolution angle of the revolving super structure. If the structure is a structure configured to move linearly, "the operation amount of the structure" denotes a movement operation amount, such as the movement direction and movement speed of the structure.

With this, the flow rate of the hydraulic oil from the control valve can be adjusted by reducing the pilot pressure, to be applied to the control valve, by the solenoid-operated reducing valve. In other words, the torque corresponding to the manipulation amount of the remote control valve is obtained from the torque of the electric motor and the torque of the hydraulic motor. Thus, the torque of the hydraulic motor can be controlled. Moreover, the flow rate of the hydraulic oil of the control valve is precisely controlled since the solenoid-operated reducing valve reduces the pressure of the pilot hydraulic oil based on the opening position control signal output from the controller. Therefore, the necessary amount of torque of the hydraulic motor is generated by supplying the hydraulic oil, the flow rate of which is precisely controlled, to the hydraulic motor. Thus, the energy efficiency can be improved.

Moreover, the electric motor may have a regeneration function of converting inertial energy into electric energy when the hydraulic motor decelerates, and the hydraulic motor circuit configured to supply the hydraulic oil to the hydraulic motor may include a communication mechanism configured to cause an suction port and discharge port of the hydraulic motor to communicate with each other when the hydraulic motor decelerates. With this, the generation of the brake torque of the hydraulic motor can be prevented by activating the communication mechanism by a communication command output from the controller when the hydraulic motor decelerates. Thus, the inertial energy can be efficiently converted into the electric energy by the regeneration function of the electric motor. Therefore, the inertial energy can be recovered as the regenerative electric power.

Further, the controller may be configured to output an opening position adjustment command for adjusting an opening position of the communication mechanism when the hydraulic motor decelerates. With this, at the time of deceleration of the hydraulic motor, in a case where it is impossible to brake the hydraulic motor only by the regeneration function (regeneration brake torque) of the electric motor, a case where brake torque generated by the electric motor has exceeded an acceptable value, a case where voltage and current control values of the capacitor have exceeded acceptable values, or the like, the hydraulic motor is caused to generate the shortfall of the brake torque by the opening position adjustment of the communication mechanism. Thus, the hydraulic motor can decelerate.

Moreover, the communication mechanism may include solenoid-operated relief valves each configured to cause the suction port and discharge port of the hydraulic motor to communicate with each other. With this, when the hydraulic motor decelerates, the suction port and discharge port of the hydraulic motor are caused to communicate with each other by opening the solenoid-operated relief valve corresponding to a rotational direction of the hydraulic motor. Thus, the pressure loss generated on the discharge side of the hydraulic motor can be avoided. On this account, the substantially entire amount of inertial energy can be efficiently recovered as the electric energy by the regenerative action of the electric motor. In addition, the brake torque of the hydraulic motor can be generated by relief pressure control of the solenoid-operated relief valve, and thus it is possible to brake the hydraulic motor.

Further, the communication mechanism may include a bypass valve configured to cause the suction port and discharge port of the hydraulic motor to communicate with each other. With this, when the hydraulic motor decelerates, the suction port and discharge port of the hydraulic motor are caused to communicate with each other by opening the bypass valve. Thus, the pressure loss generated on the discharge side of the hydraulic motor can be avoided. On this account, the substantially entire amount of inertial energy can be efficiently recovered as the electric energy by the regenerative action of the electric motor. In addition, the brake torque of the hydraulic motor can be generated by the opening position control of the bypass valve, and thus it is possible to brake the hydraulic motor.

Moreover, the control valve may include two control valves whose opening positions are controlled when the hydraulic motor performs positive rotation or negative rotation and accelerates or decelerates, and each of these two control valves may include a solenoid-operated reducing valve configured to reduce the pilot pressure, to be applied to pilot ports of each of the control valves, based on the opening position control signal output from the controller; the hydraulic motor circuit may include a check valve configured to suction the oil to the suction port of the hydraulic motor in a case where the discharge port of the hydraulic motor is open to a tank by the two control valves when the hydraulic motor decelerates; and the controller may be configured to perform meter-in control or meter-out control of the control valve when the hydraulic motor decelerates. With this, by independently controlling these two control valves by the meter-in control and the meter-out control and opening the control valve corresponding to the rotational direction when the hydraulic motor decelerates, the discharge port is open to the tank. Thus, the pressure loss generated on the discharge side of the hydraulic motor can be avoided, and the substantially entire amount of inertial energy can be efficiently recovered as the electric energy by the regenerative action of the electric motor. In addition, the brake torque of the hydraulic motor can be generated by the opening position control of the control valve by the meter-out control, and thus it is possible to brake the hydraulic motor. The torque of the hydraulic motor can be controlled by the meter-in control.

Further, the hydraulic motor may be constituted by a variable displacement motor. With this, when the hydraulic motor decelerates, the tilt angle of the hydraulic motor is set to zero. Thus, the flow rate becomes zero, and the oil does not circulate. Therefore, the brake torque can be set to zero. On this account, the substantially entire amount of inertial energy can be efficiently recovered as the electric energy by the regenerative action of the electric motor. In addition, the brake torque of the hydraulic motor can be generated by the tilt control of the hydraulic motor, and thus it is possible to brake the hydraulic motor.

Moreover, the hydraulic pump may be configured to be controlled by negative control in which tilt control of the hydraulic pump is performed based on the flow rate of the surplus oil of the amount of oil flowing through the control valve and necessary for a revolution operation or by positive control in which the tilt control of the hydraulic pump is performed based on a pressure difference between the pilot ports of the control valve. With this, the tilt of the hydraulic pump is controlled in accordance with an operating state of the control valve, and the ejection amount of the hydraulic pump can be controlled based on the amount of oil necessary to drive the hydraulic motor.

Further, the solenoid-operated reducing valve may be constituted by an inverse proportional valve. With this, even if the solenoid-operated reducing valve cannot be controlled due to malfunctions of the solenoid-operated reducing valve or electric malfunctions, maximum control pressure is directly applied to the pilot ports of the control valve, and the operation can be performed only by the oil pressure.

Moreover, the controller may be configured to, when the structure starts revolving and accelerating, transmit the opening position control signal to the solenoid-operated reducing valve of the control valve to drive the hydraulic motor such that shortfall corresponding to torque obtained by subtracting drive torque, which is able to be output by the electric motor, from the torque necessary to accelerate the structure is compensated by drive torque of the hydraulic motor. With this, when the structure that is the inertial body starts revolving and accelerating, the structure can be revolved while calculating respective energies such that: the torque necessary to accelerate the structure is obtained by the drive torque which can be output by the electric motor in accordance with the voltage of the capacitor; and the shortfall corresponding to the torque obtained by subtracting the drive torque of the electric motor from the torque necessary to accelerate the structure is compensated by the drive torque of the hydraulic motor. Thus, the use efficiency of the stored electric energy can be improved. In addition, the hydraulic oil is supplied to the hydraulic motor through the control valve configured to be precisely controlled by the solenoid-operated reducing valves such that the hydraulic oil, the amount of which is an amount capable of outputting the torque for compensating the shortfall of the torque of the electric motor, flows through the control valve. Therefore, the energy efficiency becomes high.

Advantageous Effects of Invention

According to the present invention, in order that the amount of hydraulic oil for driving the hydraulic motor becomes optimal, the amount of hydraulic oil is adjusted in accordance with the manipulation amount of the remote control valve by precisely controlling the control valve by the solenoid-operated reducing valves. Therefore, the efficiency of the energy for driving the structure by the hydraulic motor can be improved.

BRIEF DESCRIPTION OF DRAWINGS

FIG. 9A is a hydraulic circuit diagram when the drive controller is performing the positive rotation and is accelerating, and FIG. 9B is a hydraulic circuit diagram when the drive controller is performing the positive rotation and is decelerating.

FIG. 10A is a hydraulic circuit diagram when the drive controller shown in FIG. 8 is performing the negative rotation and is accelerating, and FIG. 10B is a hydraulic circuit diagram when the drive controller shown in FIG. 8 is performing the negative rotation and is decelerating.

DESCRIPTION OF EMBODIMENTS

Figure 1:
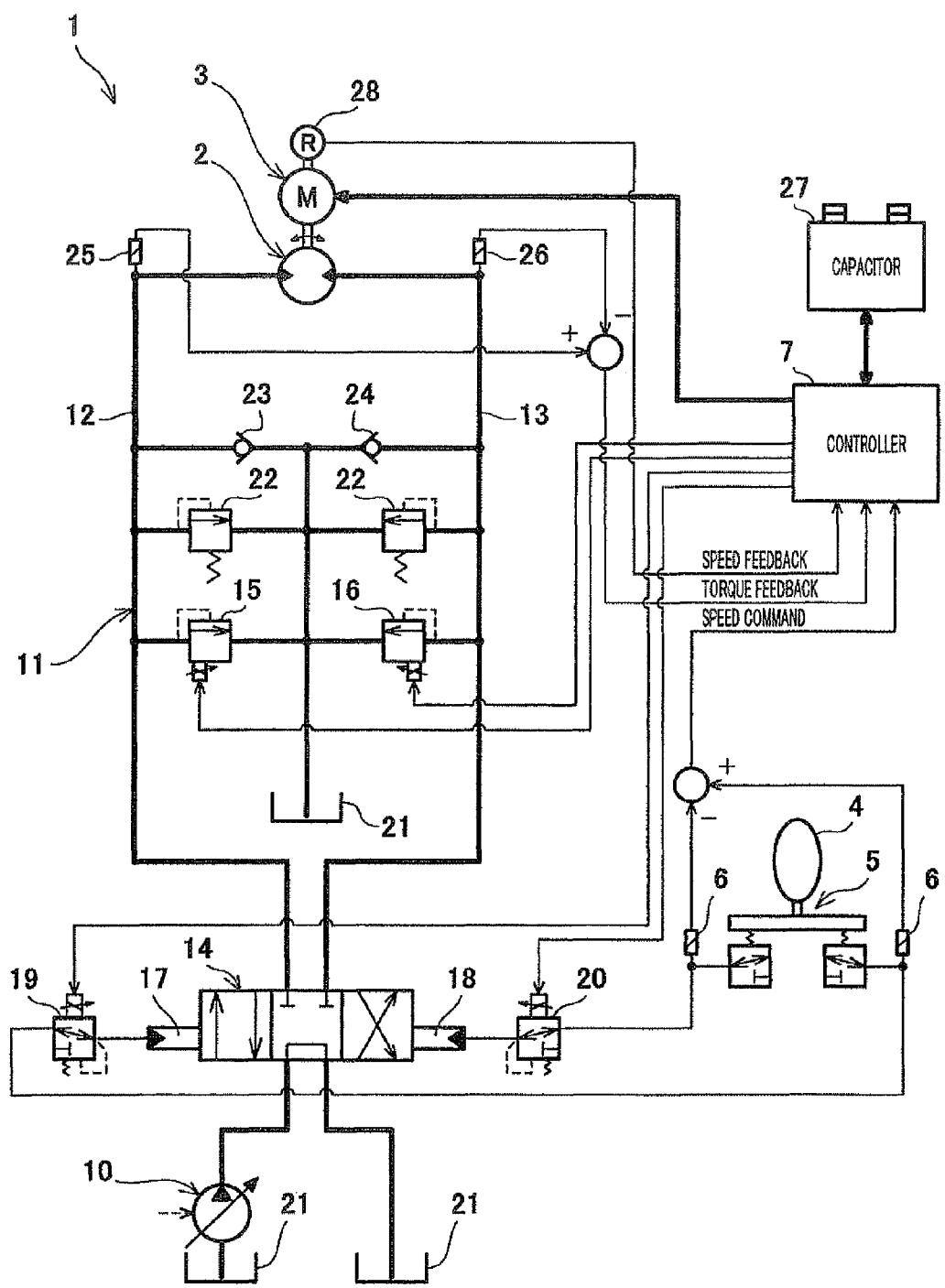
FIG. 1 is a hydraulic circuit diagram of a drive controller according to Embodiment 1 of the present invention.

Hereinafter, embodiments of the present invention will be explained based on the drawings. In the following embodiments, a revolving super structure of a hydraulic excavator will be explained as an example of a structure of an operating machine. As shown in FIG. 1, a drive controller 1 according to Embodiment 1 is configured to revolve the revolving super structure (not shown) by a hydraulic motor 2 and an electric motor 3 in cooperation. In addition, the drive controller 1 according to Embodiment 1 is configured such that when the hydraulic motor 2 decelerates, inertial energy (kinetic energy) of the hydraulic motor 2 is converted into electric energy by a regeneration function of the electric motor 3, and the inertial energy is recovered. Since the regeneration function of the electric motor 3 which is caused to perform a regenerative action as a power generator is a known technology, a detailed explanation thereof is omitted.

The drive controller 1 includes a remote control valve 5 configured to determine an operation amount of the revolving super structure. The operation amount includes a revolution direction, revolution speed, and the like of the revolving super structure. The remote control valve 5 includes an inclination handle 4 configured to determine the revolution direction of the revolving super structure. The revolution direction and speed of the revolving super structure is determined by the inclination direction, angle, speed, and the like of the inclination handle 4. The remote control valve 5 is provided with a pressure sensor 6 configured to detect secondary pressure corresponding to a manipulation amount of the remote control valve 5. A pressure difference between left and right ports of the remote control valve 5 is detected by the pressure sensor 6 and is input to a controller 7 as a speed command (number-of-rotations command) for causing the revolving super structure to rotate. When a positive signal corresponds to positive rotation, a negative signal corresponds to negative rotation.

The hydraulic motor 2 is driven by hydraulic oil ejected by a hydraulic pump 10. The hydraulic motor 2 is connected to a hydraulic motor circuit 11 configured to suction the hydraulic oil from the hydraulic pump 10 and discharge the hydraulic oil. In the hydraulic motor circuit 11, oil passages 12 and 13 respectively connected to an suction port and discharge port of the hydraulic motor 2 are connected to the hydraulic pump 10 via a control valve 14. The control valve 14 controls the flow rate of the hydraulic oil supplied from the hydraulic pump 10 to the hydraulic motor circuit 11. The suction port and discharge port of the hydraulic motor 2 switch in accordance with a rotational direction of the hydraulic motor 2.

Solenoid-operated relief valves 15 and 16 that are communication mechanisms are provided between the oil passages 12 and 13 of the hydraulic motor circuit 11. When the hydraulic motor 2 decelerates, the oil passages 12 and 13 are caused to communicate with each other through the solenoid-operated relief valves 15 and 16. With this, it is possible to avoid the loss generated on the discharge side of the hydraulic motor 2. Since the flow direction of the hydraulic oil is different between when the hydraulic motor 2 performs the positive rotation and when the hydraulic motor 2 performs the negative rotation, the solenoid-operated relief valve 15 is provided toward the oil passage 13, and the solenoid-operated relief valve 16 is provided toward the oil passage 12.

To control the amount of hydraulic oil by the control valve 14, solenoid-operated reducing valves 19 and 20 are respectively provided at pilot ports 17 and 18 (revolution sections) of the control valve 14. The secondary pressure of the remote control valve 5 is introduced to the solenoid-operated reducing valves 19 and 20 as primary pressure. In the present embodiment, inverse proportional solenoid-operated reducing valves are used as the solenoid-operated reducing valves 19 and 20.

The control of the control valve 14 by the solenoid-operated reducing valves 19 and 20 is performed such that the amount of hydraulic oil corresponding to the manipulation amount of the remote control valve 5 is supplied to the hydraulic motor 2. In other words, the control of the control valve 14 by the solenoid-operated reducing valves 19 and 20 is performed based on an opening position control signal output from the controller 7. The control of opening positions of the solenoid-operated reducing valves 19 and 20 by the controller 7 is performed based on the manipulation amount of the remote control valve 5. Pilot hydraulic oil (primary pressure) supplied from the remote control valve 5 is reduced in pressure by the solenoid-operated reducing valves 19 and 20, and the opening position of the control valve 14 is adjusted by the reduced pilot pressure. As above, by controlling the opening position of the control valve 14 by the pilot pressure reduced by the solenoid-operated reducing valves 19 and 20, the amount of hydraulic oil supplied from the hydraulic pump 10 to the hydraulic motor 2 is precisely controlled. Details of the flow rate control by the controller 7 will be described later.

Relief valves 22 and check valves 23 and 24 are provided between the oil passages 12 and 13. Each of the relief valves 22 discharges the hydraulic oil to a tank 21 if the pressure in each of the oil passages 12 and 13 exceeds a pressure at the time of ordinary use. Each of the check valves 23 and 24 suctions the oil from the tank 21 if the amount of oil in the oil passages 12 and 13 decreases when the oil is circulating.

Further, pressure sensors 25 and 26 are respectively provided at the suction port and discharge port of the hydraulic motor 2. The difference between the pressure detected by the pressure sensor 25 and the pressure detected by the pressure sensor 26 (that is, the pressure difference) is input to the controller 7 as torque feedback. By the pressure difference between the suction port and discharge port of the hydraulic motor 2, the torque generated by the hydraulic motor 2 is estimated in the controller 7 (in the case of the negative signal, counter torque).

The electric motor 3 is connected to a capacitor 27 via the controller 7. The capacitor 27 is configured to store electric power for driving the electric motor 3. The capacitor 27 supplies and receives the electric power to and from the electric motor 3 via the controller 7. When the hydraulic motor 2 is accelerating to cause the revolving super structure to rotate, the capacitor 27 discharges and supplies the electric power to the electric motor 3 which cooperates with the hydraulic motor 2. When the hydraulic motor 2 is decelerating, the capacitor 27 stores regenerative electric power obtained by causing the electric motor 3 to perform the regenerative action so as to brake the hydraulic motor 2. As above, when the hydraulic motor 2 accelerates, the controller 7 outputs a rotation command to the electric motor 3 which cooperates with the hydraulic motor 2. When the hydraulic motor 2 decelerates, the controller 7 outputs a regeneration command to the electric motor 3 so as to brake the hydraulic motor 2.

Further, the electric motor 3 is provided with a rotation sensor 28. The number of rotations detected by the rotation sensor 28 is input to the controller 7 as speed feedback. By this speed feedback, an acceleration rate is calculated in the controller 7 based on the difference between the speed command (number-of-rotations command) from the remote control valve 5 and the actual number of rotations.

The controller 7 adjusts the torque of the electric motor 3 and the torque of the hydraulic motor 2 so as to obtain predetermined torque from the electric motor 3 and the hydraulic motor 2. Specifically, the controller 7 causes the electric motor 3 to rotate in accordance with a speed command (number-of-rotations signal) based on a pressure difference signal of the remote control valve 5, torque feedback (torque signal) based on the pressure difference signal of the hydraulic motor 2, speed feedback (actual number of rotations) based on the number-of-rotations signal of the electric motor 3, and the manipulation amount of the remote control valve 5. In addition, to compensate for the shortfall of the torque of the electric motor 3, the controller 7 supplies the hydraulic oil to the hydraulic motor 2 to cause the hydraulic motor 2 to rotate while transmitting the opening position control signal to the solenoid-operated reducing valves 19 and 20 to adjust the opening position of the control valve 14.

To be specific, the hydraulic motor 2 drives to obtain the torque corresponding to the shortfall calculated by subtracting the torque of the electric motor 3 from revolution drive torque which corresponds to the manipulation amount of the remote control valve 5. In this case, the solenoid-operated reducing valves 19 and 20 provided at the control valve 14 are controlled based on the opening position control signal output from the controller 7, and the hydraulic motor 2 is driven by the hydraulic oil supplied via the control valve 14 whose opening position is controlled by the solenoid-operated reducing valves 19 and 20.

As a method of controlling the solenoid-operated reducing valves 19 and 20 of the control valve 14 by the controller 7, when the remote control valve 5 is manipulated, and the controller 7 determines that the revolving super structure accelerates, and the electric energy capable of driving the electric motor 3 is being stored in the capacitor 27, the electric motor 3 is preferentially driven by the electric energy. In this case, the shortfall calculated by subtracting the torque of the electric motor 3 from the necessary torque is compensated by the hydraulic motor 2 driven by the hydraulic oil supplied through the control valve 14 controlled as above. In this period, the solenoid-operated relief valves 15 and 16 do not basically operate. However, the solenoid-operated relief valves 15 and 16 may be subsidiarily used to compensate for a pressure control performance of the control valve 14.

By precisely controlling the opening position of the control valve 14 by the solenoid-operated reducing valves 19 and 20, the distribution of the torque of the electric motor 3 and the torque of the hydraulic motor 2 can be changed precisely. For example, if the stored energy of the capacitor 27 has become equal to or lower than a prescribed value, the torque of the electric motor 3 is gradually decreased, and at the same time, the torque of the hydraulic motor 2 is increased. Thus, the switching from the electric motor 3 to the hydraulic motor 2 can be performed smoothly in a shockless manner.

In contrast, when the remote control valve 5 is manipulated, and the controller 7 determines that the revolving super structure decelerates, the electric motor 3 is caused to perform the regenerative action, and the regenerative electric power obtained by converting the inertial energy into the electric energy is stored in the capacitor 27. At this time, the solenoid-operated relief valve 15 or 16 on the brake side is set to an unloaded state, and the operating oil is caused to circulate.

In a case where it is determined that the entire inertial energy cannot be recovered by the electric motor 3 (for example, in a case where brake torque generated by the electric motor 3 has exceeded an acceptable value or in a case where voltage and current control values of the capacitor 27 have exceeded acceptable values), a set pressure of the brake-side solenoid-operated relief valve 15 or 16 is adjusted to increase the resistance in the oil passages 12 and 13. With this, the shortfall of the brake torque can be generated by the hydraulic motor 2. The distribution of the torque of the electric motor 3 and the torque of the hydraulic motor 2 is preset to a ratio by which the energy utilization ratio becomes most preferable. Then, the distribution is changed in accordance with state changes (such as the stored energy of the capacitor 27 being equal to or lower than a default value) related to the torque of the electric motor 3 and the torque of the hydraulic motor 2. Thus, the total of the torque of the electric motor 3 and the torque of the hydraulic motor 2 becomes the necessary revolution drive torque.

As above, the pilot hydraulic oil from the remote control valve 5 is supplied to the solenoid-operated reducing valves 19 and 20 controlled based on the command output from the controller 7, and the opening position of the control valve 14 can be controlled by the pilot pressure which is reduced by the solenoid-operated reducing valves 19 and 20 based on the opening position control signal output from the controller 7. With this, the flow rate of the hydraulic oil supplied to the hydraulic motor 2 can be precisely controlled. Thus, the hydraulic oil of the hydraulic pump 10 is not discharged through the relief valves 22 during the normal operation. Therefore, the energy efficiency can be improved.

Figure 2:
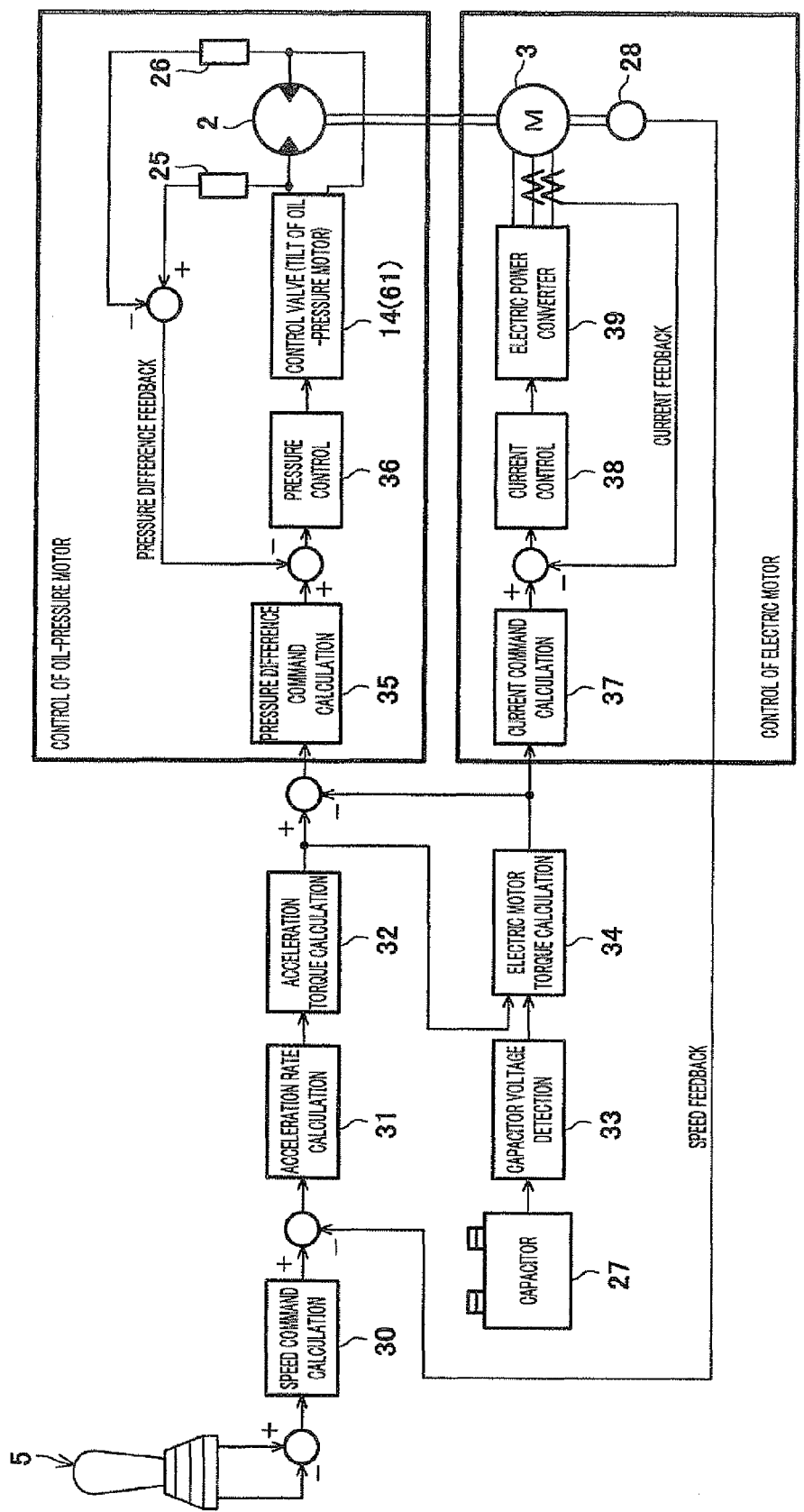
FIG. 2 is a control block diagram of the drive controller shown in FIG. 1.

As shown by the control block diagram of the drive controller 1 in FIG. 2, the speed is calculated by a speed command calculation 30 based on the incline direction and manipulation amount of the remote control valve 5. Based on the difference between this speed and the speed feedback supplied from the rotation sensor 28 provided at the electric motor 3, an acceleration rate calculation 31 calculates the necessary acceleration rate. Then, an acceleration torque calculation 32 calculates the acceleration torque of the acceleration rate.

A capacitor voltage detection 33 detects the voltage of the capacitor 27. Based on the voltage, the entire torque calculated by the acceleration torque calculation 32, and the like, an electric motor torque calculation 34 calculates the torque which can be output by the electric motor 3. The calculated torque which can be output by the electric motor 3 is subtracted from the entire torque calculated by the acceleration torque calculation 32, and the obtained torque is the necessary torque of the hydraulic motor 2. In a case where the necessary torque of the hydraulic motor 2 needs to be limited (for example, in a case where suction port pressure of the hydraulic motor 2 needs to be equal to or higher than a certain value), the necessary torque of the hydraulic motor 2 may be subtracted from the entire torque to obtain the torque which should be output by the electric motor 3.

Then, as the control of the hydraulic motor 2, a pressure difference command calculation 35 is performed with respect to the necessary torque of the hydraulic motor 2. The pressure difference feedback from the pressure sensors 25 and 26 configured to detect the pressures at the suction port and discharge port of the hydraulic motor 2 is subtracted from the pressure difference command. Based on the result of this calculation, the opening position control signal is output to the solenoid-operated reducing valves 19 and 20 by a pressure control 36. Thus, the position of a spool of the control valve 14 (in Embodiment 4 described below, the tilt of a variable displacement motor) is controlled. With this, the hydraulic motor 2 is driven so as to output the torque obtained by subtracting from the entire torque the torque which can be output by the electric motor 3.

As the control of the electric motor 3, current is calculated by a current command calculation 37 such that the electric motor 3 outputs the torque calculated by the electric motor torque calculation 34. A feedback signal of the current supplied to the electric motor 3 is subtracted from the above calculation result. Based on the result of this calculation, current control 38 controls the current. An electric power converter 39 is controlled by this current. Thus, the electric motor 3 is driven. the driving of the electric motor 3 is detected by the rotation sensor 28 and is fed back to the calculation result of the speed command calculation 30 as the speed feedback.

Next, one example of an operation sequence by the drive controller 1 will be explained based on FIG. 3. As the operation sequence, the speed command by the remote control valve 5, the actual speed performance of the revolving super structure, the generated torque of the electric motor 3, the assist torque of the hydraulic motor 2, and the total of the torque of the electric motor 3 and the torque of the hydraulic motor 2 are shown, and a horizontal axis denotes a time axis.

Figure 3:
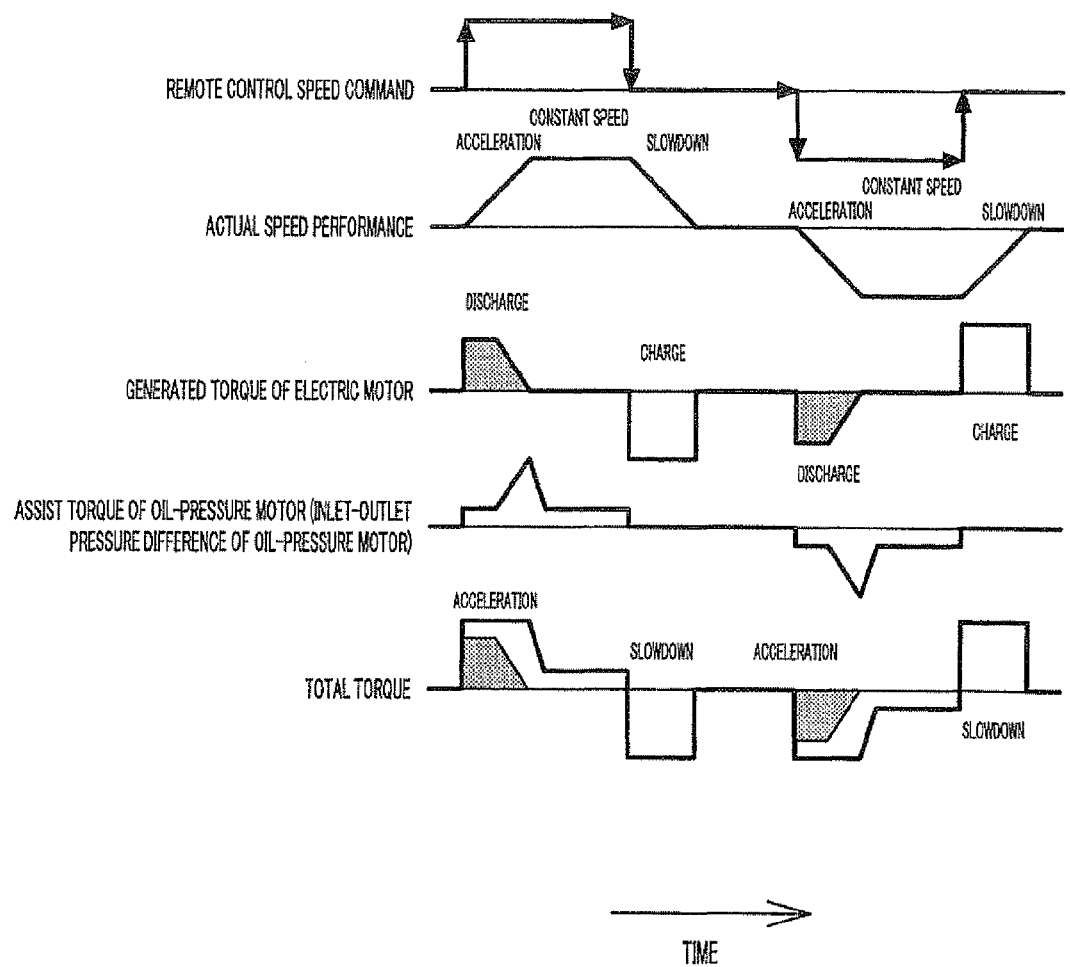
FIG. 3 is a drive sequence diagram of a revolving super structure driven by the drive controller shown in FIG. 1.

In the example shown in FIG. 3, as shown by the actual speed performance, the remote control valve 5 is inclined to one side to cause the revolving super structure to "accelerate" and revolve at "constant speed" in one direction. Then, the remote control valve 5 is returned to neutral to "decelerate" the revolving super structure. Next, the remote control valve 5 is inclined to the other side to cause the revolving super structure to "accelerate", revolve at "constant speed", and "decelerate" in the other direction.

When the remote control valve 5 is manipulated, and the speed command corresponding to an upper direction shown in FIG. 3 (corresponding to the revolution in one direction) is output, the electric motor 3 is rotated to generate predetermined torque as the torque for causing the revolving super structure that is the inertial body to rotate. Thus, the capacitor 27 discharges the electric power, and the hydraulic motor 2 is driven so as to compensate for the shortfall of the torque of the electric motor 3. With this, the electric motor 3 and the hydraulic motor 2 are driven such that large synthetic torque for accelerating the revolving super structure that is the inertial body at the time of the start of the revolution is obtained by the total of the torque of the electric motor and the torque of the hydraulic motor. To be specific, when starting revolving the revolving super structure which is in a stop state, to obtain the maximum energy saving effect, the output of the electric motor 3 is utilized, and the shortfall is compensated by the hydraulic motor 2. When the revolving super structure is revolved at constant speed, small revolve torque is obtained only by the hydraulic motor 2. When the revolving super structure decelerates, the substantially entire amount of inertial energy is efficiently recovered as the electric energy by the regenerative action of the electric motor 3, and the electric energy is stored in the capacitor 27.

FIG. 3 shows that after the above operation, the remote control valve 5 is manipulated in the opposite direction. However, since actions other than the generation of the torque in the opposite direction are the same as the above actions, explanations thereof are omitted.

As above, according to the drive controller 1 of Embodiment 1, the shortfall that is the torque obtained by subtracting the torque, which can be generated by the electric motor 3, from the entire torque which is based on the manipulation amount of the remote control valve 5 is generated by the hydraulic motor 2. In this case, the amount of hydraulic oil for driving the hydraulic motor 2 can be precisely adjusted to the optimal amount by controlling the control valve 14 by the pilot pressure reduced by the solenoid-operated reducing valves 19 and 20. With this, the efficiency of the energy for driving the revolving super structure can be improved by the electric motor 3 and the hydraulic motor 2. In addition, since the voltage of the capacitor 27 is monitored, and the revolution control is performed while calculating the energy which can be supplied to the electric motor 3, the use efficiency of the stored energy can be improved.

When the hydraulic motor 2 decelerates, the pressure loss generated on the discharge side of the hydraulic motor 2 can be avoided by opening the solenoid-operated relief valve 15 or 16. With this, the substantially entire amount of inertial energy of the revolving super structure can be recovered as the electric energy by the regenerative action of the electric motor 3. Thus, the drive controller 1 can be operated with high energy efficiency.

Further, to prevent swinging generated by, for example, an oil compression effect obtained by this type of hydraulic drive when stopping the revolving super structure, the number of rotations of the electric motor 3 is observed, and the torque of the electric motor 3 is controlled at the time of the stop. Thus, riding quality can be improved. Since the torque of the electric motor 3 and the torque of the hydraulic motor 2 are individually controlled, the revolution feeling can be set freely.

In addition, in the above embodiment, by using the inverse proportional solenoid-operated reducing valves as the solenoid-operated reducing valves 19 and 20 configured to control the pilot ports 17 and 18 of the control valve 14, the secondary pressure of the remote control valve 5 is directly input to the pilot ports 17 and 18 of the control valve 14 if the solenoid-operated reducing valves 19 and 20 are uncontrollable due to malfunctions or electric malfunctions of the solenoid-operated reducing valves 19 and 20. Therefore, it is possible to configure the drive controller 1 which can perform the revolution operation only by the oil pressure and is highly reliable.

Next, one example of the configuration by which a further energy saving effect is obtained by a drive system of the hydraulic pump 10 by simultaneously performing tilt control of the hydraulic pump 10 in the drive controller 1 will be explained. A method of controlling the hydraulic pump 10 explained below may be suitably selected depending on use conditions and the like.

Figure 4:
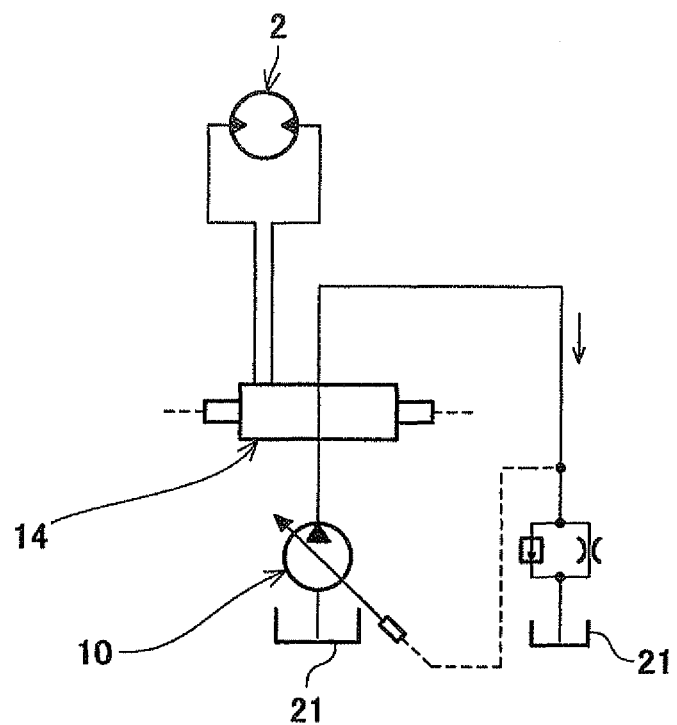
FIG. 4 is a hydraulic circuit diagram showing a first example of a method of controlling a hydraulic pump in the drive controller shown in FIG. 1.

FIG. 4 shows one example of open center negative control as the control of the hydraulic pump 10. In this case, the oil, the amount of which is necessary for the revolution operation of the hydraulic motor 2, is caused to flow through the control valve 14, and based on the flow rate of surplus oil ejected from a center bypass and flowing out to the tank 21, the pump flow rate is controlled by tilting a swash plate of the hydraulic pump 10. With this, the tilt control of the hydraulic pump 10 is performed such that the oil, the amount of which is necessary for the driving of the hydraulic motor 2, is supplied. Therefore, the energy efficiency is excellent, and the energy saving effect can be obtained by further reducing the energy loss.

Figure 5:
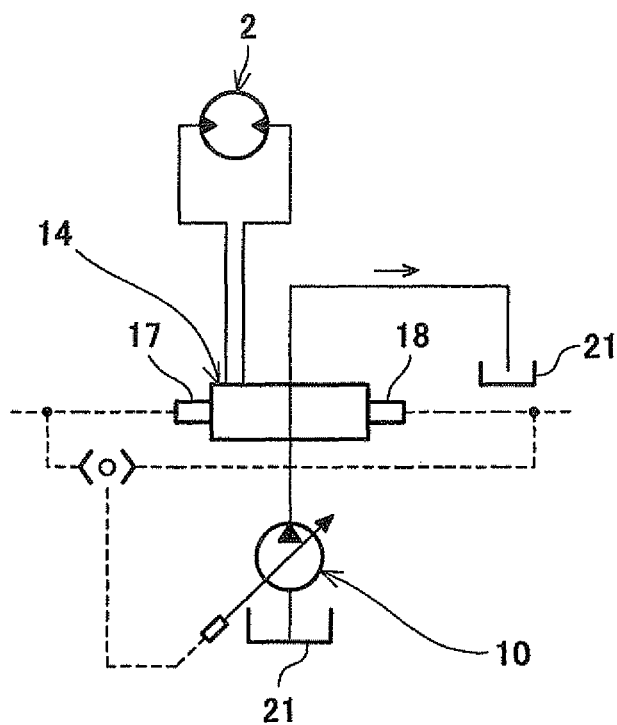
FIG. 5 is a hydraulic circuit diagram showing a second example of the method of controlling the hydraulic pump in the drive controller shown in FIG. 1.
Figure 6:
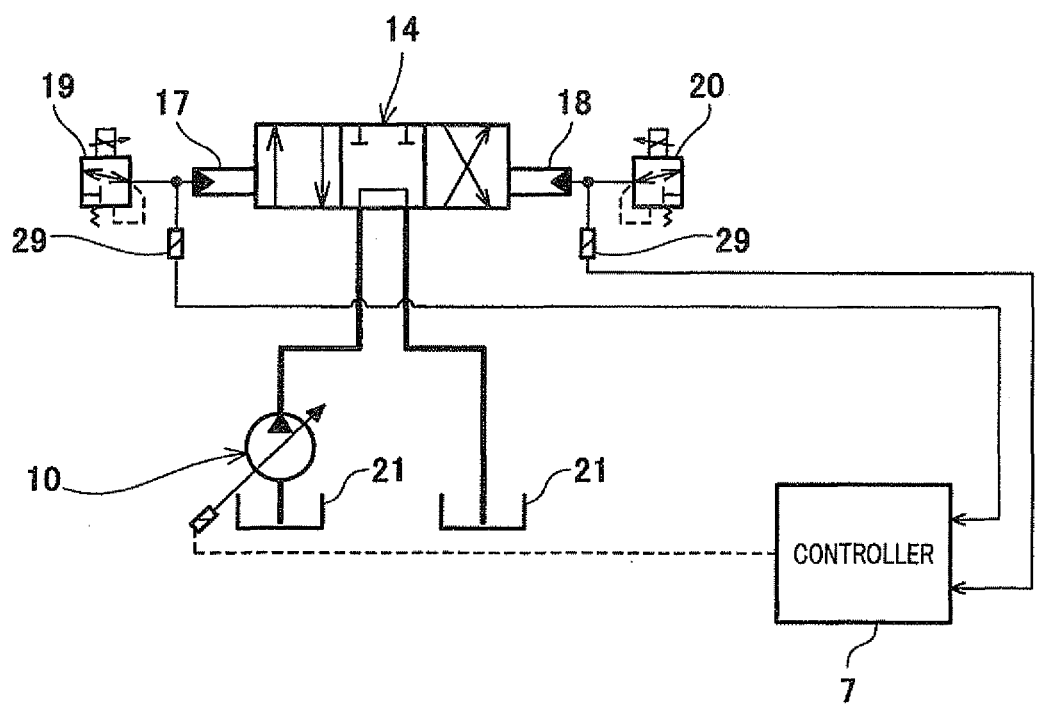
FIG. 6 is a hydraulic circuit diagram showing a third example of the method of controlling the hydraulic pump in the drive controller shown in FIG. 1.

FIG. 5 shows one example of open center positive control. In this case, a higher one of the pilot pressure applied to the pilot port 17 of the control valve 14 and the pilot pressure applied to the pilot port 18 of the control valve 14 is selected, and the pump flow rate is controlled by tilting the swash plate of the hydraulic pump 10 based on this higher pressure. With this, the tilt of the hydraulic pump 10 is controlled such that the oil, the amount of which corresponds to the speed command obtained by the manipulation of the remote control valve, is supplied. Thus, the energy efficiency is excellent, and the energy saving effect can be obtained by further reducing the energy loss. Further, as shown by an example in FIG. 6, a more excellent energy saving effect can be obtained by more precisely controlling the amount of oil by electric positive control in which: pressure sensors 29 detect the pilot pressures from the solenoid-operated reducing valves 19 and 20; and based on the higher one of the detected two pressures, the tilt of the hydraulic pump 10 is electrically controlled by the controller 7.

Figure 7:
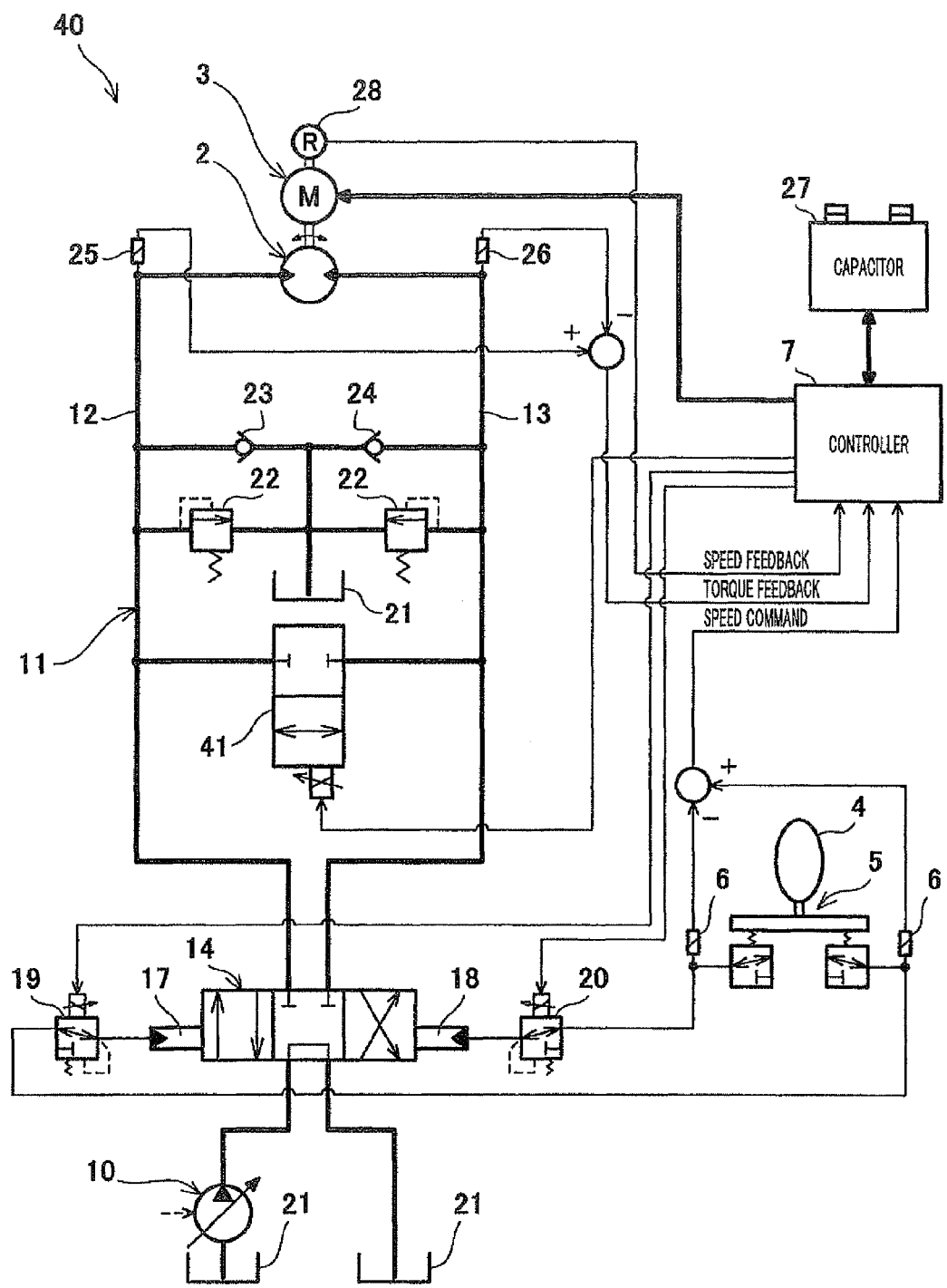
FIG. 7 is a hydraulic circuit diagram of the drive controller according to Embodiment 2 of the present invention.

FIG. 7 shows a drive controller 40 according to Embodiment 2 and shows an example in which a bypass valve 41 is used instead of the solenoid-operated relief valves 15 and 16 that are the communication mechanisms in Embodiment 1 described above. Only the bypass valve 41 is different between the drive controller 40 of Embodiment 2 and the drive controller 1 of Embodiment 1. Therefore, the same reference signs are used for the same components, and explanations thereof are omitted.

In Embodiment 2, the bypass valve 41 that is the communication mechanism is provided between the oil passages 12 and 13 of the hydraulic motor circuit 11, and the opening position of the bypass valve 41 is controlled by the controller 7 described above. As with Embodiment 1 described above, the controller 7 performs control operations by using the speed command based on the pressure difference signal of the remote control valve 5, the torque feedback based on the pressure difference signal indicating the pressure difference between the suction port and discharge port of the hydraulic motor 2, and the speed feedback based on the number-of-rotations signal by the rotation sensor 28 of the electric motor 3.

In Embodiment 2, by opening the bypass valve 41 when the hydraulic motor 2 decelerates, the pressure loss generated on the discharge side of the hydraulic motor 2 can be avoided. With this, the inertial energy can be efficiently converted into the electric energy by the regenerative action of the electric motor 3. In addition, in Embodiment 2, by adjusting the opening position of the bypass valve 41 when braking the hydraulic motor 2, desired brake torque can be obtained.

Figure 8:
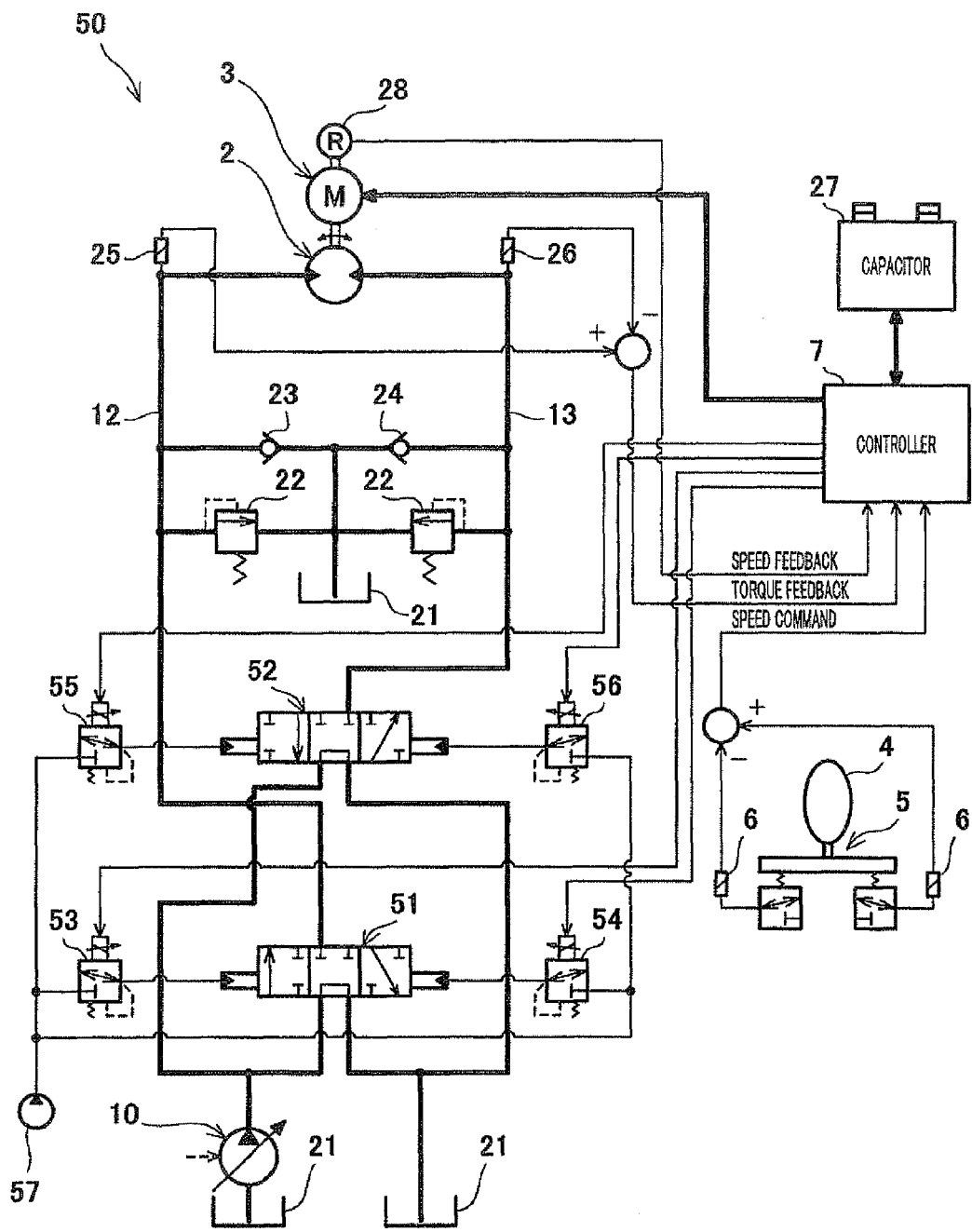
FIG. 8 is a hydraulic circuit diagram of the drive controller according to Embodiment 3 of the present invention.

FIG. 8 is a hydraulic circuit diagram of a drive controller 50 according to Embodiment 3. In Embodiment 3, meter-in control and meter-out control of the control valve can be independently performed. The same reference signs are used for the same components as in Embodiment 1, and detailed explanations thereof are omitted.

As shown in FIG. 8, in Embodiment 3, a first control valve 51 and a second control valve 52 are provided. First solenoid-operated reducing valves 53 and 54 are respectively provided at the pilot ports of the first control valve 51, and second solenoid-operated reducing valves 55 and 56 are respectively provided at the pilot ports of the second control valve 52. In this example, proportional solenoid-operated reducing valves are used as the first solenoid-operated reducing valves 53 and 54 and the second solenoid-operated reducing valves 55 and 56. In addition, in Embodiment 3, to increase the degree of freedom (pressure range) of the pilot pressure for controlling the first solenoid-operated reducing valves 53 and 54 and the second solenoid-operated reducing valves 55 and 56, a second hydraulic pump 57 configured to supply the pilot hydraulic oil is provided.

Further, in a case where it is impossible to brake the hydraulic motor 2 only by the brake torque of the electric motor 3 when the hydraulic motor 2 decelerates, the controller 7 of Embodiment 3 transmits the opening position control signal to the first solenoid-operated reducing valves 53 and 54 and the second solenoid-operated reducing valves 55 and 56 to adjust the brake torque of the hydraulic motor 2. With this, the first control valve 51 or the second control valve 52 adjusts by the meter-out control the flow rate of the hydraulic oil discharged from the hydraulic motor 2.

According to the drive controller 50 of Embodiment 3, when the revolving super structure accelerates, opening position control is performed on a meter-in side, and the opening position is fully open on a meter-out side. When the revolving super structure decelerates, the opening position is completely closed on the meter-in side, the hydraulic oil from the hydraulic pump 10 is set to an unloaded state, and the opening position control is performed on the meter-out side. With this, the deceleration torque of the hydraulic motor 2 is controlled.

Figure 9A:
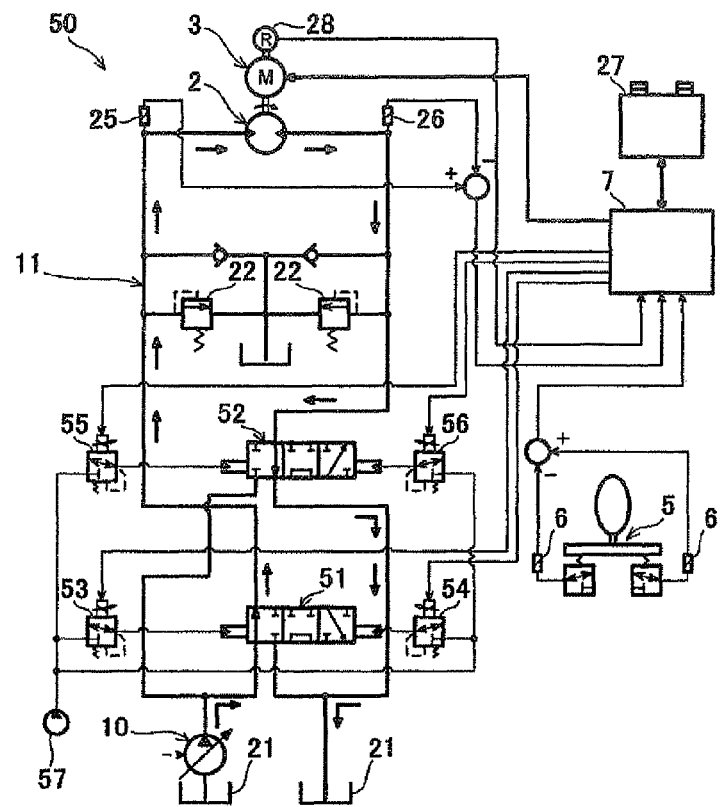
FIGS. 9A and 9B are hydraulic circuit diagrams when the drive controller shown in FIG. 8 is performing positive rotation.

Specifically, as shown in FIG. 9A, when the revolving super structure is performing the positive rotation and is accelerating, the opening position control signal is transmitted to the first solenoid-operated reducing valve 53 and the second solenoid-operated reducing valve 55, and the first control valve 51 and the second control valve 52 are caused to slide to the right. With this, the hydraulic oil from the hydraulic pump 10 is supplied through the first control valve 51 to the suction port of the hydraulic motor 2. The discharge port of the hydraulic motor 2 communicates with the tank 21 through the second control valve 52. With this, the hydraulic motor 2 is caused to rotate by the hydraulic oil supplied through the first control valve 51. In this example, the amount of hydraulic oil supplied to the hydraulic motor 2 is adjusted by controlling the opening position of the first control valve 51 (meter-in control).

Figure 9B:
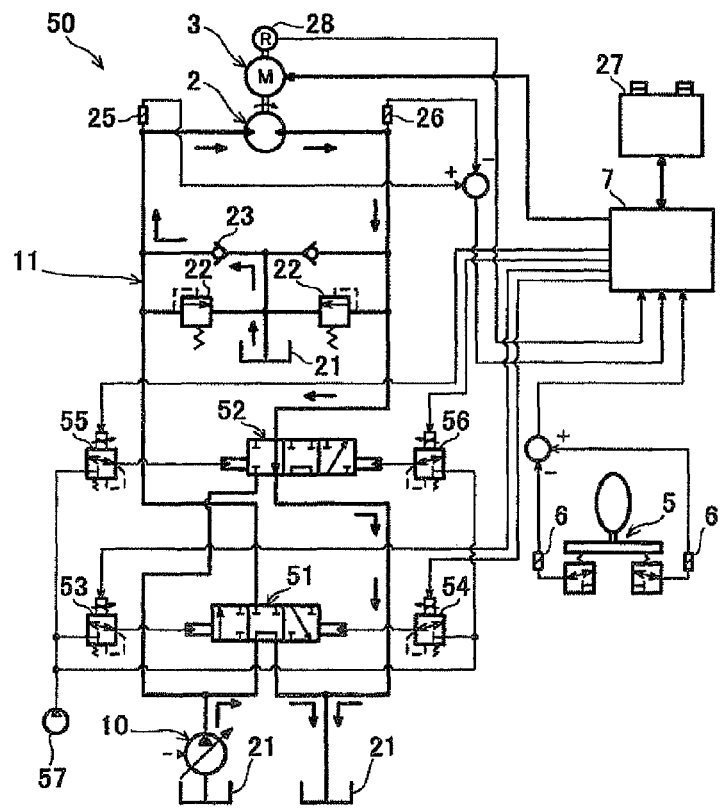

As shown in FIG. 9B, when the revolving super structure is performing the positive rotation and is decelerating, the spool of the first control valve 51 is returned, the hydraulic oil from the hydraulic pump 10 is caused to return to the tank 21, and the discharge port of the hydraulic motor 2 is caused to communicate with the tank 21 through the second control valve 52. With this, the oil discharged through the discharge port of the hydraulic motor 2 is discharged to the tank 21. The oil that is the shortfall of the oil discharged from the hydraulic motor circuit 11 is supplied from the tank 21 to the suction port of the hydraulic motor 2 through the check valve 23.

Therefore, it is possible to avoid the pressure loss generated on the discharge port side when the hydraulic motor 2 decelerates. With this, the substantially entire amount of inertial energy can be efficiently recovered as the electric energy by the regenerative action of the electric motor 3. In addition, by adjusting the pilot pressure of the second control valve 52 by the second solenoid-operated reducing valve 55, the hydraulic motor 2 can be caused to generate the brake torque, and it is possible to brake the hydraulic motor 2 (meter-out control).

Figure 10A:
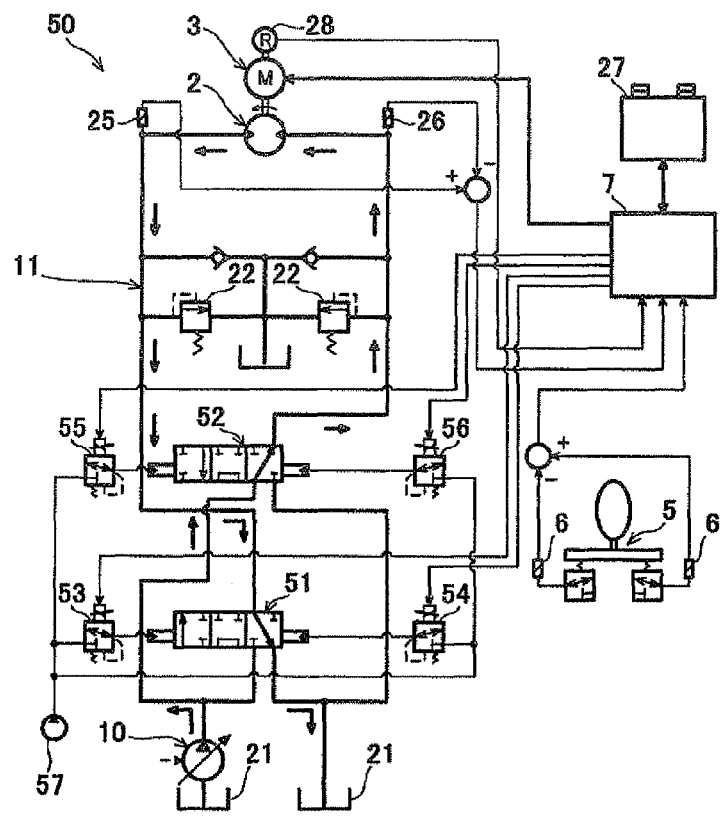
FIGS. 10A and 10B are hydraulic circuit diagram when the drive controller shown in FIG. 8 is performing negative rotation.

As shown in FIG. 10A, when the revolving super structure is performing negative rotation and is accelerating, the opening position control signal is transmitted to the first solenoid-operated reducing valve 54 and the second solenoid-operated reducing valve 56, and the first control valve 51 and the second control valve 52 are caused to slide to the left. With this, the hydraulic oil from the hydraulic pump 10 is supplied through the second control valve 52 to the suction port of the hydraulic motor 2, and the discharge port of the hydraulic motor 2 is caused to communicate with the tank 21 through the first control valve 51. Thus, the hydraulic motor 2 is caused to rotate by the hydraulic oil supplied through the second control valve 52. As above, the amount of hydraulic oil supplied to the hydraulic motor 2 is adjusted by controlling the opening position of the second control valve 52 (meter-in control).

Figure 10B:
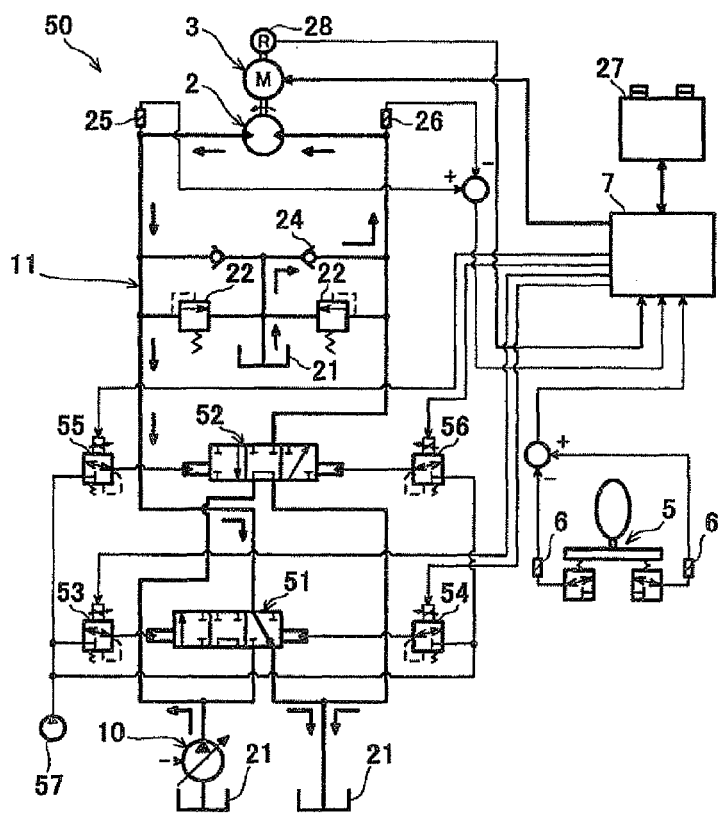

As shown in FIG. 10B, when the revolving super structure is performing the negative rotation and is decelerating, the spool of the second control valve 52 is returned, the hydraulic oil from the hydraulic pump 10 is caused to return to the tank 21, and the discharge port of the hydraulic motor 2 is caused to communicate with the tank 21 through the first control valve 51. With this, the oil discharged through the discharge port of the hydraulic motor 2 is discharged to the tank 21. The shortfall of the oil discharged from the hydraulic motor circuit 11 is supplied from the tank 21 to the suction port of the hydraulic motor 2 through the check valve 24.

Therefore, it is possible to avoid the pressure loss generated on the discharge port side when the hydraulic motor 2 decelerates. With this, the substantially entire amount of inertial energy can be efficiently recovered as the electric energy by the regenerative action of the electric motor 3. In addition, by adjusting the pilot pressure of the first control valve 51 by the first solenoid-operated reducing valve 54, the hydraulic motor 2 can be caused to generate the brake torque, and it is possible to brake the hydraulic motor 2 (meter-out control).

Such control is performed by using the control valves 51 and 52 whose opening positions are controlled by the solenoid-operated reducing valves 53, 54, 55, and 56 controlled by the command output from the controller 7. Therefore, the flow rate of the oil supplied to the hydraulic motor 2 can be precisely controlled. With this, the discharge of the hydraulic oil of the hydraulic pump 10 through the relief valves 22 is not substantially performed, and the energy efficiency can be improved.

Figure 11:
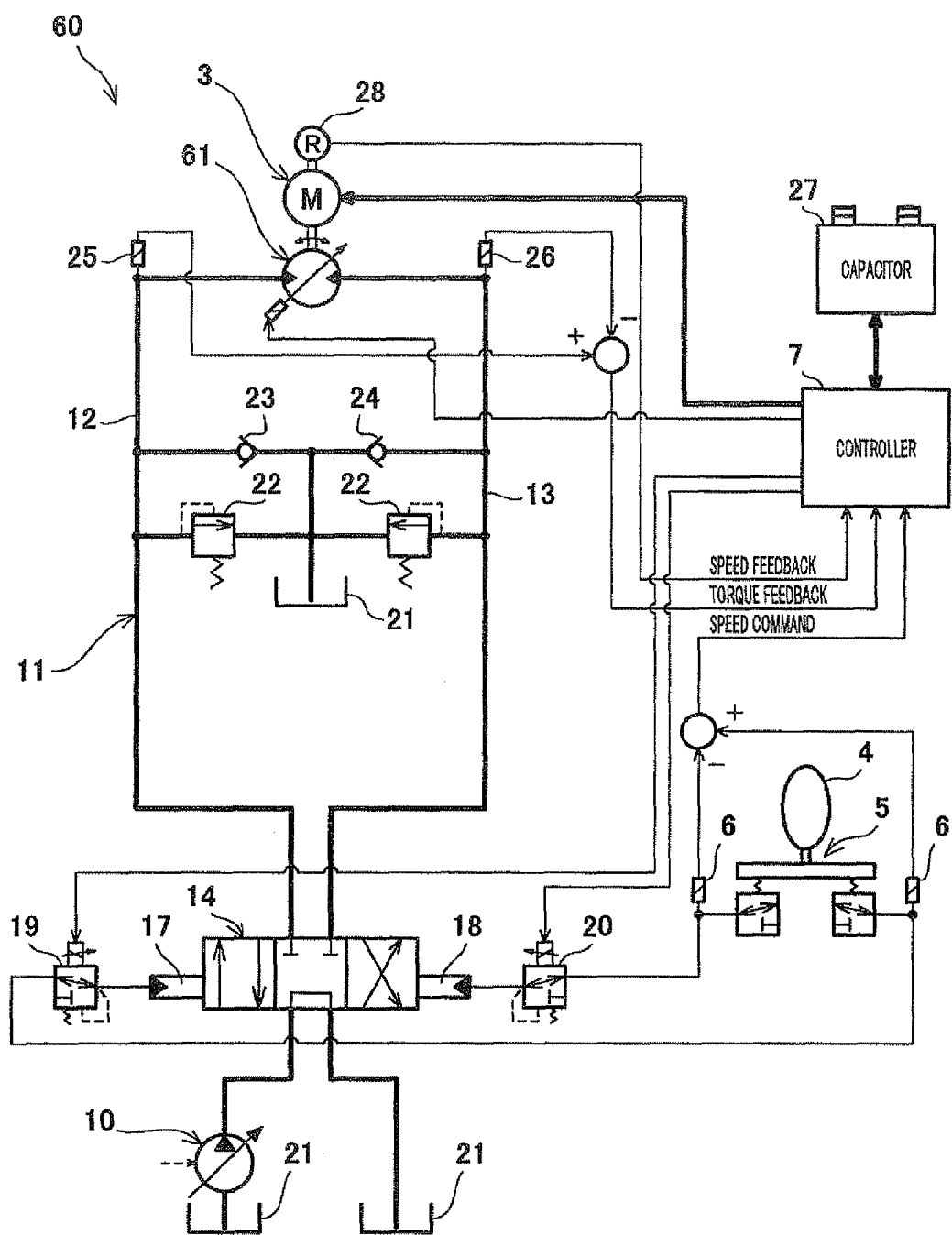
FIG. 11 is a hydraulic circuit diagram of the drive controller according to Embodiment 4 of the present invention.

FIG. 11 is a hydraulic circuit diagram of a drive controller 60 according to Embodiment 4. In Embodiment 4, a variable displacement motor 61 is used instead of the fixed tilt hydraulic motor 2 of the above embodiment. The same reference signs are used for the same components as in Embodiment 1, and explanations thereof are omitted.

As shown in FIG. 11, the variable displacement motor 61 configured to drive the revolving super structure does not generate torque at zero tilt. Therefore, the variable displacement motor 61 increases the tilt in accordance with the torque necessary when the revolving super structure accelerates, and at the same time, the necessary amount of oil is supplied to the variable displacement motor 61 by controlling the opening position of the control valve 14. The opening position of the control valve 14 is also controlled by controlling the opening positions of the pilot ports 17 and 18 by the pilot hydraulic oil reduced in pressure by the solenoid-operated reducing valves 19 and 20. Therefore, the flow rate of the oil can be precisely controlled, and the energy efficiency can be improved.

When the variable displacement motor 61 decelerates, the control valve 14 is completely closed, the hydraulic pump 10 is set to an unloaded state, the tilt of the variable displacement motor 61 is decreased, and at the same time, the inertial energy is converted into the electric energy by the regenerative action of the electric motor 3. The tilt angle of the variable displacement motor 61 is changed, that is, the swash plate of the variable displacement motor 61 is tilted by a tilt command from the controller 7 such that the ejection amount of the variable displacement motor 61 becomes zero (the brake torque of the hydraulic motor 61 is not generated).

As above, in Embodiment 4, the variable displacement motor 61 can generate the hydraulic torque in accordance with the tilt amount. Therefore, when the variable displacement motor 61 decelerates, the swash plate of the variable displacement motor 61 can be tilted such that the ejection amount becomes zero, and the generation of the brake torque by the variable displacement motor 61 can be prevented. With this, the substantially entire amount of inertial energy can be efficiently recovered as the electric energy by the regenerative action of the electric motor 3, and the electric energy can be stored in the capacitor 27.

As above, according to each of the drive controllers 1, 40, 50, and 60 of the above embodiments, the amount of hydraulic oil supplied to drive the hydraulic motor 2 or 61 is precisely controlled by the pilot hydraulic oil reduced in pressure by the solenoid-operated reducing valve 19, 20, 53, 54, 55, or 56 each provided at the control valve 14, 51, or 52. Therefore, the oil, the amount of which is necessary for the revolution operation, can be caused to flow through the control valve 14, 51, or 52, and thus the hydraulic motor 2 can be driven. With this, the loss by the hydraulic oil returning through the relief valves 22 to the tank 21 can be reduced, and the efficiency of the energy for driving the revolving super structure can be improved.

When the revolving super structure decelerates, the substantially entire amount of inertial energy (rotational energy) of the revolving super structure is efficiently recovered as the electric energy by the regenerative action of the electric motor 3, and the electric energy is stored in the capacitor 27. The stored electric energy is used when the revolving super structure accelerates next time. Therefore, the energy use efficiency improves, the fuel efficiency of the operating machine improves, and the discharge of greenhouse gases can be suppressed.

Further, in the above embodiments, the stored energy of the capacitor 27 is preferentially used to drive the electric motor 3, and the shortfall is compensated by the hydraulic motor 2 or 61. Therefore, the acceleration can be quickly performed, and the use efficiency of the stored energy can be improved.

In addition, as in the above embodiments, the brake torque of the hydraulic motor 2 is variable by performing, based on the signals from the controller 7, the opening position control of the solenoid-operated relief valves 15 and 16 or the bypass valve 41 that are the communication mechanisms or the opening position control in methods, such as the meter-in and meter-out control. Therefore, in a case where it is impossible to brake the hydraulic motor 2 only by the brake torque (regenerative action) of the electric motor 3 when the hydraulic motor 2 decelerates (in a case where the entire inertial energy cannot be recovered by the electric motor 3), the necessary amount of brake torque is generated by the hydraulic motor 2. Thus, the hydraulic motor 2 can easily decelerate.

Moreover, the distribution of the torque of the hydraulic motor 2 can be precisely adjusted by controlling the opening position of the control valves 14, 51, or 52 through the solenoid-operated reducing valve 19, 20, 53, 54, 55, or 56. Therefore, the switching from the electric motor 3 to the hydraulic motor 2 can be performed in a shockless manner.

The above embodiments have explained the example in which the stored energy of the capacitor 27 is preferentially used to drive the electric motor 3, and the torque shortfall is compensated by the hydraulic motor 2 or 61. However, in a case where the stored energy of the capacitor 27 is small in amount, the electric motor 3 may not be used, and the revolving super structure may be caused to rotate only by the hydraulic motor 2 or 61. Thus, the above embodiments are not limited to the configuration in which the electric motor 3 is preferentially used, and the shortfall is compensated by the hydraulic motor 2 or 61.

Moreover, the above embodiments are not limited to the configuration in which the secondary pressure of the remote control valve 5 is introduced as the primary pressure of the solenoid-operated reducing valves 19 and 20. The same operational advantages as above can be obtained as long as the pilot hydraulic oil supplied to the pilot ports 17 and 18 of the control valve 14 is precisely controlled by the solenoid-operated reducing valves 19 and 20. Thus, the present invention is not limited to the configuration described in the above embodiments.

Further, in the above embodiments, the revolving super structure of the hydraulic excavator was explained as one example of the structure of the operating machine. However, the present invention is applicable to the other structure of the other operating machine, such as the revolving super structure of a crane or the base carrier of a wheel loader. Thus, the present invention is not limited to the above embodiments.

Each of the above embodiments is just one example, and various modifications may be made within the spirit of the present invention. The present invention is not limited to the above embodiments.

INDUSTRIAL APPLICABILITY

The drive controller of the operating machine according to the present invention can be utilized in the operating machine in which the hydraulic motor and the electric motor are provided in the drive system in the heavy machinery, such as a hydraulic excavator or a hydraulic crane.

REFERENCE SIGNS LIST

1 drive controller
2 hydraulic motor
3 electric motor
4 inclination handle
5 remote control valve
6 pressure sensor
7 controller
10 hydraulic pump
11 hydraulic motor circuit
12, 13 oil passage
14 control valve
15, 16 solenoid-operated relief valve
17, 18 pilot port
19, 20 solenoid-operated reducing valve
21 tank
22 relief valve
23, 24 check valve
25, 26, 29 pressure sensor
27 capacitor
28 rotation sensor
30 speed command calculation
31 acceleration rate calculation
32 acceleration torque calculation
33 capacitor voltage detection
34 electric motor torque calculation
35 pressure difference command calculation
36 pressure control
37 current command calculation
38 current control
39 electric power converter
40 drive controller
41 bypass valve
50 drive controller
51 first control valve
52 second control valve
53, 54 first solenoid-operated reducing valve
55, 56 second solenoid-operated reducing valve
60 drive controller
61 variable displacement motor

The invention claimed is:

1. A drive controller of an operating machine, the drive controller comprising:
 a hydraulic motor configured to be driven by hydraulic oil supplied from a hydraulic pump through a hydraulic motor circuit;
 an electric motor configured to drive a structure in cooperation with the hydraulic motor,
 a remote control valve configured to determine an operation amount of the structure;
 an electric motor torque calculation portion configured to calculate torque to be output from the electric motor;
 a hydraulic motor torque calculation portion configured to calculate torque to be output from the hydraulic motor;
 a control valve configured to control a flow rate of the hydraulic oil supplied from the hydraulic pump to the hydraulic motor in accordance with input pilot pressure;
 a solenoid-operated reducing valve configured to reduce the pilot pressure based on an input opening position control signal;
 a controller configured to cause the electric motor to output the torque calculated by the electric motor torque calculation portion and output the input opening position control signal to the solenoid-operated reducing valve to cause the hydraulic motor to output the torque calculated by the hydraulic motor torque calculation portion, wherein the electric motor torque calculation portion and the hydraulic motor torque calculation portion respectively calculate the torque to be output from the electric motor and the torque to be output from the hydraulic motor such that a sum of the torque to be output from the electric motor and the torque to be output from the hydraulic motor becomes equal to an entire torque corresponding to the operation amount of the structure determined by the remote control valve.

2. The drive controller according to claim 1, wherein:
 the electric motor has a regeneration function of converting inertial energy into electric energy when the hydraulic motor decelerates; and
 the hydraulic motor circuit includes a communication mechanism configured to cause an suction port and discharge port of the hydraulic motor to communicate with each other when the hydraulic motor decelerates.

3. The drive controller according to claim 2, wherein the controller is configured to output an opening position adjustment command for adjusting an opening position of the communication mechanism when the hydraulic motor decelerates.

4. The drive controller according to claim 2, wherein the communication mechanism includes a solenoid-operated relief valve configured to cause the suction port and discharge port of the hydraulic motor to communicate with each other.

5. The drive controller according to claim 2, wherein the communication mechanism includes a bypass valve configured to cause the suction port and discharge port of the hydraulic motor to communicate with each other.

6. The drive controller according to claim 1, wherein:
 the control valve includes two control valves whose opening positions are controlled when the hydraulic motor performs positive rotation or negative rotation and accelerates or decelerates, and each of these two control valves includes a solenoid-operated reducing valve configured to reduce the pilot pressure based on the opening position control signal output from the controller;
 the hydraulic motor circuit includes a check valve configured to suction the oil to the suction port of the hydraulic motor in a case where the discharge port of the hydraulic motor is open to a tank by the two control valves when the hydraulic motor decelerates; and the controller is configured to perform meter-in control or meter-out control of the control valve when the hydraulic motor decelerates.

7. The drive controller according to claim 1, wherein the hydraulic motor is constituted by a variable displacement motor.

8. The drive controller according to claim 1, wherein the hydraulic pump is configured to be controlled by negative control in which tilt control of the hydraulic pump is performed based on the flow rate of the surplus oil of the amount of oil flowing through the control valve and necessary for a revolution operation or by positive control in which the tilt control of the hydraulic pump is performed based on a pressure difference between the pilot ports of the control valve.

9. The drive controller according to claim 1, wherein the solenoid-operated reducing valve is constituted by an inverse proportional valve.

10. The drive controller according to claim 1, wherein the controller is configured to, when the structure starts revolving and accelerating, transmit the opening position control signal to the solenoid-operated reducing valve of the control valve to drive the hydraulic motor such that shortfall corresponding to torque obtained by subtracting drive torque, which is able to be output by the electric motor, from the torque necessary to accelerate the structure is compensated by drive torque of the hydraulic motor.

* * * * *